United States Patent [19]

Kruger

[11] 4,336,602
[45] Jun. 22, 1982

[54] NETWORK FOR GENERATING MODIFIED MICROCODE ADDRESSES

[75] Inventor: Lawrence M. Kruger, Clifton Park, N.Y.

[73] Assignee: Control Data Corporation, Minneapolis, Minn.

[21] Appl. No.: 77,955

[22] Filed: Sep. 24, 1979

[51] Int. Cl.³ .................. G06F 9/26; G06F 13/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,634,883 | 1/1972 | Kreidermacher | 364/200 |
| 3,766,532 | 10/1973 | Liebel | 364/200 |
| 3,839,705 | 10/1974 | Davis et al. | 364/200 |
| 3,930,236 | 12/1975 | Ferguson et al. | 364/200 |
| 4,027,291 | 5/1977 | Tokura et al. | 364/200 |
| 4,100,601 | 7/1978 | Kaufman et al. | 364/200 |
| 4,124,888 | 11/1978 | Washburn | 364/200 |
| 4,124,893 | 11/1978 | Joyce | 364/200 |
| 4,151,597 | 4/1979 | Huu et al. | 364/900 |
| 4,168,523 | 9/1979 | Chari | 364/200 |

Primary Examiner—Harvey E. Springborn
Attorney, Agent, or Firm—William J. McGinnis, Jr.; Joseph A. Genovese

[57] ABSTRACT

In a microcode control memory for a computer central processing unit, a network is provided for generating a modified microcode address in a sequence of instructions where the modified address is determined by a function of the results of preselected events.

7 Claims, 1 Drawing Figure

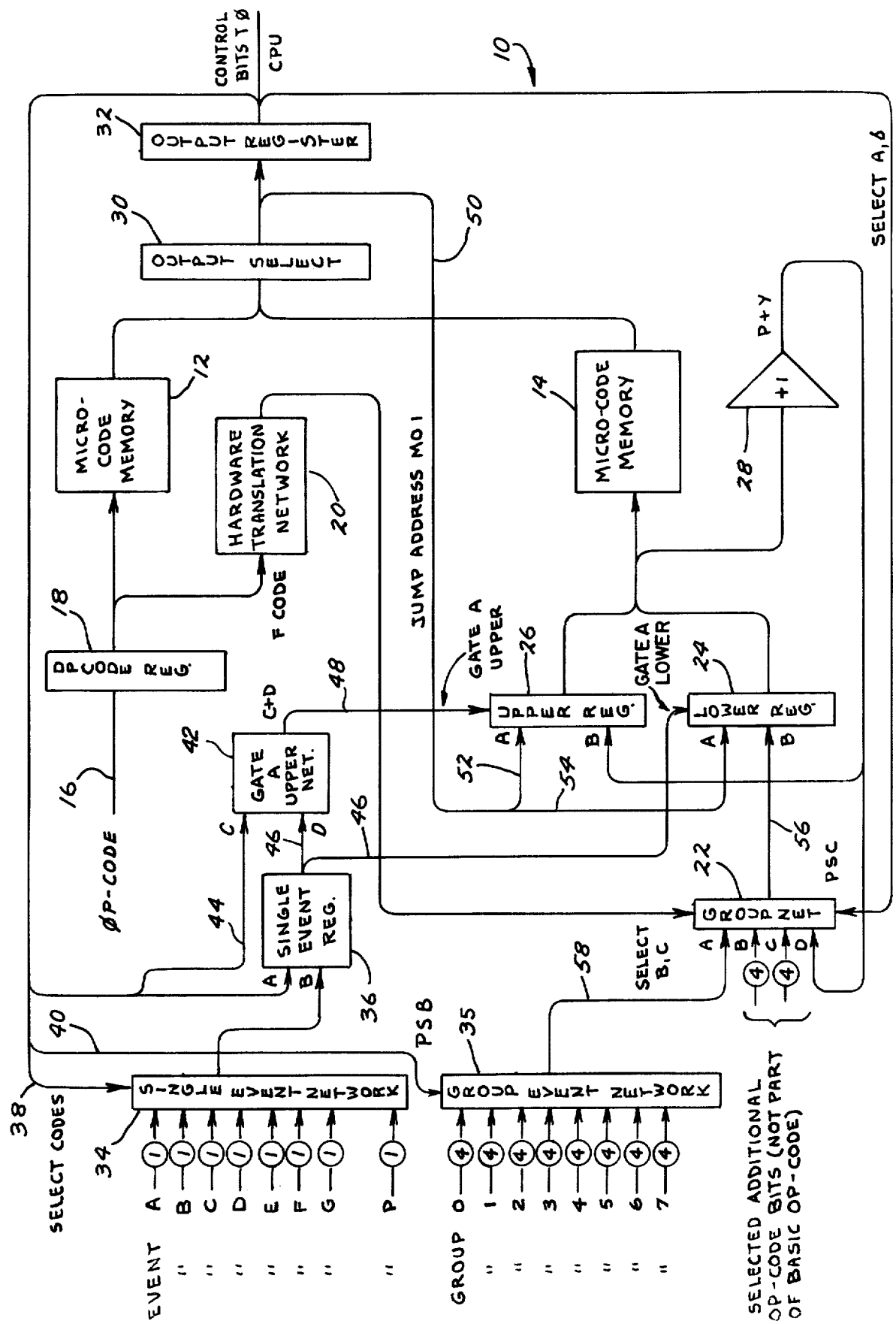

4,336,602

NETWORK FOR GENERATING MODIFIED MICROCODE ADDRESSES

BACKGROUND OF THE INVENTION

This invention relates to microcode control memory systems for controlling the central processing unit of a computer system as various program instructions are supplied to it. More particularly, this application relates to a system in which the microcode address sequence for performing a particular program instruction may be altered in progress by sensing conditions in the central processing unit of the computer which will control the microcode instruction sequence.

Certain patents are known to applicant in the prior art which may be relevant to this application. U.S. Pat. No. 3,980,991 shows a system in which a sensed condition is used to control a particular microcode instruction. However, that patent does not anticipate the sophisticated system of the present application.

U.S. Pat. No. 4,079,451 shows a logic means to select the mode of operation of an indirect addressing system between a fast and a slow mode. The fact that the mode of operation is changed dependent upon system conditions may be relevant to the concept of the present invention. Address modification of the type shown in this application is not contemplated by this patent.

U.S. Pat. No. 4,021,779 shows a different type of microprogram control system in which only changes in the control status of the system are stored rather than the complete status for every step in the sequence. Thus, every element of every instruction is not stored when only changes in a condition are stored in memory. This patent is mentioned because it shows the sensing of conditions during a program sequence but the program sequence itself is not altered by the sensed conditions; only the way that the program is stored in memory is altered. U.S. Pat. No. 4,042,972 shows a microprogram system in which sensed conditions are used to cause the skipping of an instruction in a program sequence as the result of a sensed condition, but this patent does not show the altering of microcode instructions in the way contemplated by the present application.

The sensing of operating conditions in a computer system during a microprogrammed instruction sequence is known. However, no prior art known to the present inventor shows the efficiency of microcode memory design accomplished in the present system by using sensed conditions in the computer system to alter the microcode sequence while in operation. Thus, the present invention requires a much smaller microcode memory control system than would be the case if every possible variation and control state had to be specifically preprogrammed into the microcode control memory. The sensing of conditions and alteration of microcode control instruction sequence allows for shorter address length and less microcode memory capacity than would otherwise be the case in a complicated computer system.

SUMMARY OF THE INVENTION

The present invention uses a microcode control memory system employing two separate microcode memory modules. The first microcode memory handles single step microcode instructions and the second microcode memory handles multi-step microcode control instructions. The microcode memory addressing network has the basic function of generating a modified address to be used to reference a microcode memory based on both dynamic and nondynamic central processor events. Input sensing registers are provided as inputs to the memory in addition to the conventional address register. A modified address may have two parts. The first part is predetermined using a microcode address field called the jump address. The second part is the modifier address field which is not predetermined but is instead formed as a function of some preselected events in the central processor. Thus, the present invention uses appropriate logic networks to insert the sensed events gathered in appropriate registers into the appropriate address field as an input for the microcode address to generate control outputs for the central processor.

IN THE FIGURE

The FIGURE is a block diagram of a microcode memory according to the present invention.

DESCRIPTION OF THE PREFERRED EMBODIMENTS

Referring now to the FIGURE, the present invention consists of a microcode control memory system 10 in which a first microcode memory 12 and a second microcode memory 14 contain all of the control function outputs necessary to implement the instruction inputs. The modifying control output fields are provided externally to the memory to provide the complete output function. The input instruction code to the system is provided on input line 16 to an instruction code register 18. Register 18 is connected to microcode memory 12 as well as to an output hardware translation network 20. Network 20 is connected to group network select register 22 and determines from input address bits which of several possible inputs to register 22 will be selected for output from register 22. Group network select register 22 is connected to a lower address register 24 associated with microcode memory 14. An upper address register 26 provides additional input to the second microcode memory 14. An adder 28 provides an address incrementing function when the microcode memory 14 is proceeding in serial order through a sequence of instructions. Outputs from microcode memories 12 and 14 are connected to an output select network 30 which selects the appropriate microcode memory for output to the output register 32.

Variations in control state for the microcode control memory are provided through both a single event register 34 and a group event register 35. The single event register 34 is connected to a single event select register 36 the output of which is connected to register 24 as a control function. The single event network 34 receives as an input a select code on a bus 38 from the output register 32 when an appropriate instruction in a sequence of instructions is reached so that the system is functionally aware that sensed events must provide output control state bits. For the same purpose a control line 40 is also connected between register 35 for group events and the output register 32. The output of group event network 35 is connected to group select network 22 as another input.

Logic control network 42 controls whether input A or input B will be selected by way of upper register 26 as the upper portion of the address supplied to microcode memory 14. Logic control network 42 may be an OR gate as shown in the FIGURE. This network receives an input on a control line 44 from output register 32 and a control line 46 from the single event register 36 and produces an output on control line 48 connected to register 26. Similarly, control line 46 is also connected to register 24 to complete the register control process. The jump address is conveyed from the output select network 30 to an input of register 26 on line 50 which divides into a first portion 52 going to register 26 and a second portion 54 going to register 24. Each portion conveys both the upper and lower portions of the jump address to be gated as input to the microcode memory 14 under various conditions.

A description will now be provided of how the present invention provides control functions for a central processor unit based on the sensing of preselected events. For purposes of the example given in the FIGURE, the address modifier which is formed as a function of the preselected events is taken to be 4 bits wide. This modifier is an output of group network select register 22 and an input to the lower address register 24.

If the B input of the lower address register 24 is selected by the selection networks, the modifier will be used as 4 bits of the address for microcode memory 14. If the B input is not selected, then the particular 4 bits of the jump address provided on bus 50 will be used as the particular 4 bits of address to microcode memory 14. Thus, the gate A input on the lower address register 24 is responsible for causing a replacement of the lower portion of the jump address with the modifier bits on line 56. The gate A input on line 46 is the output of the single event register 36, which is a one-bit register, or flip flop, receiving a selected central processor event by way of the single event network 34.

Register 36 also receives a control bit from either microcode memory 12 or microcode memory 14 to allow inversion of the state of the selected central processor event, to cause the reverse control function. Thus, the selection of the modifier is itself actually conditioned on single central processor events. The modified jump address thus becomes a conditional modified jump address.

The upper part of the address to microcode memory 14 is contained in the upper address register 26. As in the case of the lower address register 24, there are two possible inputs and a gate A control input line from network 42. In this case, however, the B input and the gate A input are different. The B input is a particular 4 bits of the incremented form of the previous microcode address. The gate A input is the output of the gate A function from network 42 which is an OR function between its input lines 44 and 46. The input on line 46 to the gate A upper network 42 is the same as the gate A lower address on line 46 from network 36 so, therefore, whenever the A input is gated to the lower address register 24, the A input is also gated to the upper address register 26. When this occurs, the entire jump address will be used to load both the upper address register 26 and the lower address register 24.

The input to network 42 on line 44 is a control bit from microcode output register 32 which, when set, forces the gate A signal to the upper address register 26 to thus select the A input to the upper address register 26 but not affecting the gate A for lower address register 24. This situation would arise whenever a modified address is desired in that the upper 4 bits of the address to microcode memory 14 would be forced to be the upper 4 bits of the jump address while the lower 4 bits would be the modifier based on preselected conditions provided that a gate A lower address register 24 condition has not occurred.

This situation results in an important effect in that the upper 4-bit address portion would direct the next address to one of sixteen possible microcode tables, each sixteen microcode words long. The lower portion or modifier would further direct or specify the address to be exactly one of the sixteen words of that particular sixteen word table selected by the upper portion. Thus, by proper assignment of events to the inputs of group event network 35, an optimum usage of the microcode words of memory 14 will be realized. Also, a necessary conservation of hardware is attained within networks 35 and 22 since the many required inputs into those networks are quickly and efficiently gathered and selected to become the lower portion of the address to microcode 14. Thus, this efficiency of design facilitates response to 32 various CPU events within one CPU clock cycle required for dynamic, pipelined operations.

The previous explanation should have defined the basic control and data input for the two portions of a microcode address where the example assumes an 8-bit microcode address with two 4-bit portions. Thus, a jump address may be used as an entire 8-bit address or it may be divided into a 4-bit jump address portion and a 4-bit modifier portion or other relevant combinations based on the principle of this invention.

Further discussion will now be provided on the way in which a particular group event is selected to be a modifier code. Group event network 35 has, for example, eight inputs each consisting of an event group. Each of these event groups may have, for example, 4 bits each of which could form a modifier. A 3-bit select code is provided from the output register 32 as a control function to the event network 36 to select one of the eight group events to be the output provided on line 58 to network 22. The event groups are, in nature, dynamic central processor events or conditions which must be sensed by the microcode control circuitry so as to have the microcode memory generate the correct sequence of microcode control words for central processor control function based on the original instruction command provided on input line 16.

The 3-bit select code on line 40 is provided by either microcode memory 12 or 14 and is predetermined by the microcode program. There is a second rank of group selection handled by a group network 22 with one of its inputs being the output of group event network 36 received on line 58. Three other inputs may also be provided to group network 22 for example. The B and C inputs may be selected function code bits in addition to the basic input instruction code on line 16. Because the design of the system of this example shows a microcode memory 12 having 256 words which therefore does not allow an address larger than 8 bits, any additional instruction code bits must be used as modifiers to microcode memory 14. Thus, one significant advantage of the present invention is that longer instructions containing additional bits may be provided in a system having a nominal 8-bit instruction code such as for example a 12-bit instruction code in particular cases. The B or C inputs to group network 22 are selected by way of an input control code which is an output of the hardware translation network 20. Note that the hardware translation network 20 will set one of its two outputs for only a small subset of a 256 possible machine language instructions provided by the 8-bit function code. This is done since only a subset of the entire machine language instruction set needs to use the additional instruction code bits to gain information about instruction execution. Thus, the economy results in that rather than making the entire system responsive to 12-bit instructions only a particular subset of machine language instructions must be responsive to 12-bit instruction codes where an 8-bit instruction code is adequate for the majority of cases.

The fourth input to group network 22 is a particular 4 bits of the incremented 4 of the previous microcode address received from adder 28. Recall that the particular 4 bits were discussed earlier and were shown to be used as an input to the upper address register 26. This incremented form of the previous address will be used whenever it is desired to cycle sequentially through microcode addresses.

The operation of the conditional modified jump mechanism will be explained using additional special terms to refer to some of the essential control signals from microcode by a 3-letter mnemonic. Therefore:

MOD: The C input to the gate A upper network 42 which, when set, causes the A input to be gated into the upper address register 26.

PSA: This is a 4-bit select code to choose one of sixteen possible single events from the central processor to be used as a condition for conditional jumps and conditional modified jumps and is an input to group event network 36.

PSB: This is a 3-bit select code to choose one of eight groups (each 4 bits) to be used as an address modifier and is an input to group event address network 22.

PSC: This uses two control lines to choose either the A or D inputs to group event address network 22.

MO1: This is the jump address from microcode which specifies the next location to be referenced in microcode if a non-modified jump occurs. Also, if a modified jump does occur, then the upper 4 bits of this field (register 36, groups 4, 5, 6 and 7) are used as the upper 4 bits of the next microcode address with the lower 4 bits being the modifier.

NOT: This is an input to the single event register 36 and when set will invert the state of the single event sense network register 34.

With the previous discussion and definitions, an example of a conditional modified jump is as follows:

| Microcode Address Memory 1 | Microcode Fields |
|---|---|
| 81 | PSA=1,NOT=0 |
| 82 | PSB=3,PSC=2,MOD=1 |
| 83 | MO1=90 |
| 84 | ———————— |
| . | . |
| . | . |
| . | . |
| 90 | 16 word table which is |
| 91 | entered if the conditional |
| 92 | modified branch does occur. |
| . | Which word is referenced |
| . | is dependent upon what |
| . | value the modifier |
| . | has. |
| 9F | |

In the example, the microcode fields necessary for a conditional modified branch operation are shown. At address 81 are the PSA and NOT fields. With a PSA=1 code set, CPU event B will be selected into the single event network 34. With a NOT=0 code set, CPU event B will not be inverted at the event register 36. Thus the gate A lower address signal will be set if and only if event B is set. Note that if the gate A lower address signal is set then the MO1 field of address 83 will be taken into the lower address register. Because the PSA and NOT field must pass through both the output register 32 and the event register 36, whereas the MO1 field does not pass through any registers prior to reaching the lower address register 24, the PSA and NOT are set in address 81 and the MO1 field is set in address 83.

Assuming that CPU event B is not set and thus the gate A lower address is not set, then the modifier will be selected at the lower address register 24 and a modified jump will occur. The PSB=3 at address 82 will select group 3 into group event network 36. The PSC=2 at address 82 will select group 3 via the A input into group network 22. Thus, group 3 will be the modifier. The MOD=1 set at address 82 will cause a gate A upper to occur. This will insure that the MO1 field will be selected at the upper address register 26 (for the example shown, the 9 of the MO1=90 will be taken to the upper register 26). Thus, a modified jump will occur from address 83 to address 9X where X is somewhere between $0_{16}$ and $F_{16}$ dependent on what the modified is (i.e., event group 3).

The previous example showed how a conditional modified jump can be performed from address 83 to 9X. Note that both locations are contained within microcode memory 14. A modified jump operation occurring from microcode memory 12 to memory 14 will be described. Assuming microcode memory 12 is being selected at the output select 30 and that a condition occurs which will cause switching to memory 14, examine what occurs if the op-code at input line 16 is a 32 code. By definition, a 32 code is one which, when seen by the hardware translation network 20, will cause the select B control input at group event network 22 to be set. This will enable additional selected op-code bits to be gated into group network 22 via the B input, thus causing these additional op-code bits to be the modifier. Here, hardware translation network 20 rather than microcode control bits are responsible for establishing a modifier.

What is claimed is:

1. A microcode control memory for generating modified addressing, said memory being adapted to be associated with a central processor, comprising:
   (a) a first microcode memory for single step microcode control instructions for receiving an input instruction code from said central processor,
   (b) a second microcode memory for multistep microcode control instructions,
   (c) an output select network connected to said first and said second microcode memories for determining which memory is to be an output of the system,
   (d) a first input register having a plurality of inputs and one output connected to said second microcode memory for gating a first portion of an input address to said second microcode memory,
   (e) a second input register having a plurality of inputs and one output connected to said second microcode memory for gating a second portion of an input address to said second microcode memory, wherein said second input register is comprised of a second input register and a group network address register for receiving as an input groups of bits representing sensed central processor events and controlled by control signals determined from an input address including means for selecting in response to said control signals a modified jump address determined from said output selection network or the output of said group network address register to be gated as an address portion to said second microcode memory, (f) means for controlling said first input register said means being responsive to a control signal to determine which of said plurality of inputs to said first input register is to be selected as an output, (g) means for providing input control signals to said second input register to determine which of said plurality of inputs is to be used as an output of said second input register, wherein said means for supplying an input control signal to said second input register is comprised of a hardware translation network for receiving the input instruction code to said first microcode memory and producing a control signal for said second input register in response to decoding said input instruction code, (h) means for supplying as an input to said first input register a first jump address portion from said output select network, (i) means for supplying as an input to said first input register at least one additional different first address portion, (j) means for supplying as an input to said second input register a second jump address portion from said output select network, (k) means for supplying as an input to said second input register an incremented different second address portion, and (l) means for supplying as an input to said second input register a plurality of bits constituting a modifier portion of said second jump address portion consisting of signals of sensed events in said central processor, whereby said system performs a modified conditional branching address function as a result of said means for controlling said first input register and said means for providing an input control signal to said second input register operating at the same microcode memory cycle as said plurality of inputs is provided to said first input register and to said second input register so that said second microcode memory receives an input jump address which had been determined from preselected possible input addresses.

2. The system of claim 1 wherein said means for supplying to said second input register a plurality of bits constituting a modifier address portion comprises a group event network register for receiving a plurality of groups of preselected sensed central processor event signals and a control signal for selecting a single group of said signals to be the output of said group event network register, said register having its output connected to said second input register.

3. The system of claim 2 wherein said control signals for said group event network register are comprised of a group of bits from said output select network.

4. The system of claim 1 wherein said means for controlling said first input register is responsive to at least one bit from the output of said output select network.

5. The system of claim 1 wherein said means for controlling said first input register is comprised of a logic control network connected to said first input register, a source of at least one bit from said output select network connected as an input to said logic control network and a single event network connected as an input to said logic control network.

6. The system of claim 5 wherein said logic control network is an OR gate.

7. The system of claim 5 wherein said single event network receives a plurality of single bit sensed central processor event signals and a multi-bit control signal to determine a single signal to be gated to said single event network.

* * * * *